United States Patent
Esken et al.

(10) Patent No.: US 7,153,204 B2
(45) Date of Patent: Dec. 26, 2006

(54) METHOD OF CHANGING THROUGHGOING OPENINGS IN SEPARATION OF A CONCAVE OF A HARVESTER

(75) Inventors: Dirk Esken, Soest-Meckingsen (DE); Berthold Schwersmann, Bad Iburg (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 11/314,636

(22) Filed: Dec. 21, 2005

(65) Prior Publication Data
US 2006/0128452 A1 Jun. 15, 2006

Related U.S. Application Data

(62) Division of application No. 10/832,884, filed on Apr. 27, 2004.

(30) Foreign Application Priority Data
Apr. 28, 2003 (DE) ................ 103 19 254

(51) Int. Cl.
*A01F 12/28* (2006.01)
(52) U.S. Cl. .................... 460/109; 460/59
(58) Field of Classification Search .......... 460/109, 460/59, 62, 66, 79, 80, 107, 110, 146
See application file for complete search history.

(56) References Cited

U.S. PATENT DOCUMENTS

| | | | | | |
|---|---|---|---|---|---|
| 489,724 | A | * | 1/1893 | Watts | 460/109 |
| 941,037 | A | * | 11/1909 | Paschke | 460/109 |
| 993,193 | A | * | 5/1911 | Pelican | 460/107 |
| 1,269,109 | A | * | 6/1918 | Noack | 460/109 |
| 4,031,901 | A | * | 6/1977 | Rowland-Hill | 460/108 |
| 4,495,954 | A | * | 1/1985 | Yarbrough | 460/107 |
| 4,875,891 | A | * | 10/1989 | Turner et al. | 460/110 |
| 4,988,326 | A | * | 1/1991 | Bennett | 460/110 |
| 5,024,631 | A | * | 6/1991 | Heidjann et al. | 460/75 |
| 5,569,080 | A | * | 10/1996 | Estes | 460/72 |
| 5,613,907 | A | * | 3/1997 | Harden | 460/109 |
| 6,193,604 | B1 | * | 2/2001 | Ramp et al. | 460/110 |
| 6,537,148 | B1 | * | 3/2003 | Schwersmann | 460/107 |

* cited by examiner

*Primary Examiner*—Meredith C. Petravick
(74) *Attorney, Agent, or Firm*—Michael J. Striker

(57) ABSTRACT

A method for changing throughgoing openings on separation area of a concave in an agricultural harvester in which the concave is composed of at least one frame, a plurality of beater strips and wires together forming the concave separating area, arranging at least one adjusting device under the concave separating area, and adjusting a width of the throughgoing openings by the at least one adjusting device; and a device for performing the method is provided.

4 Claims, 3 Drawing Sheets

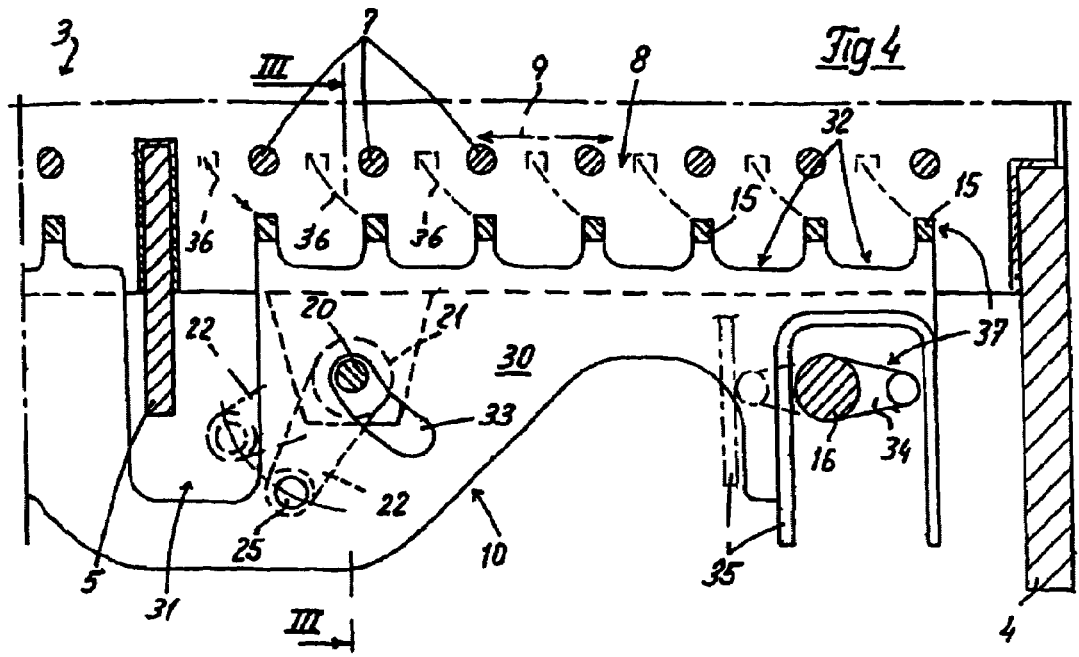
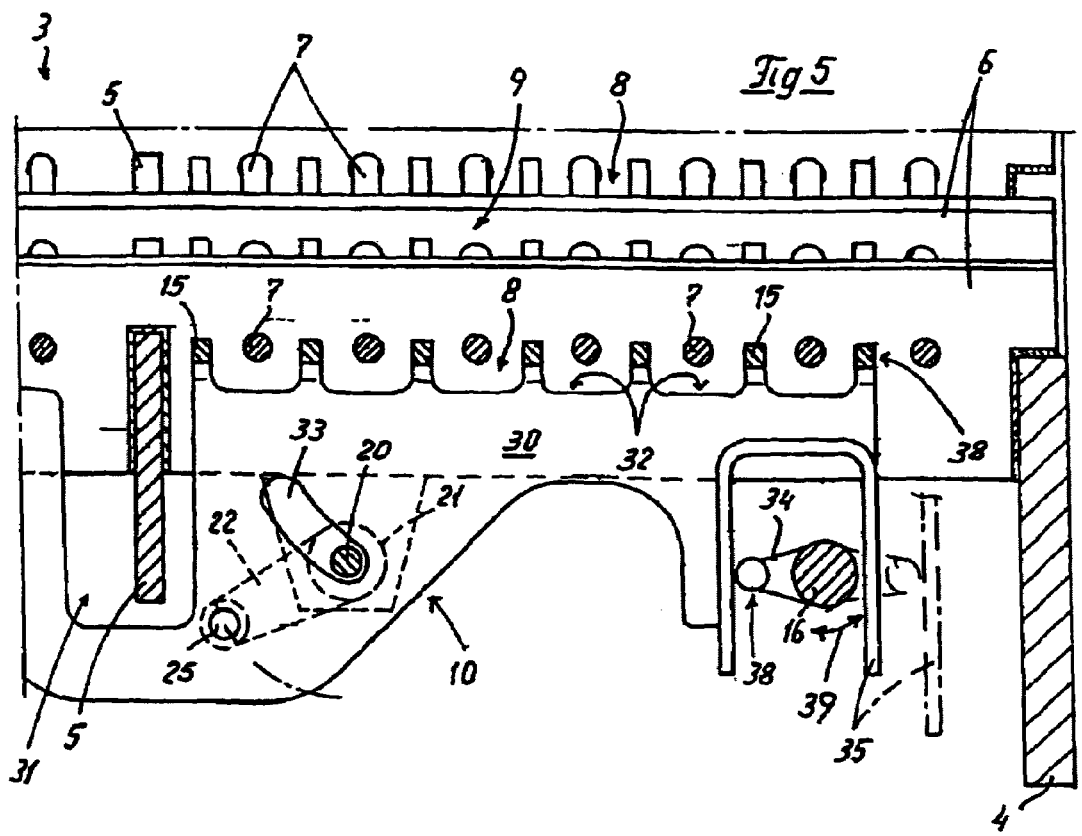

METHOD OF CHANGING THROUGHGOING OPENINGS IN SEPARATION OF A CONCAVE OF A HARVESTER

CROSS REFERENCE TO A RELATED APPLICATION

This application is a division of copending patent application Ser. No. 10/832,884 filed on Apr. 27, 2004.

BACKGROUND OF THE INVENTION

The present invention relates to a method of and a device for changing throughgoing openings of a concave in an agricultural working machine, in particular a self-propelled combined harvester.

The individual throughgoing openings of the concave separating area are determined by the distance between the beater strips and wires of the concave. The size of the throughgoing openings is decisive for the efficiency of the threshing of different crop types. For different crop types, differently sized throughgoing openings are needed to guarantee an unobjectionable threshing of the grain. Corn grains for example require greater throughgoing openings than wheat grains.

When the throughgoing openings are too great, a higher portion of non-grain components is separated on the concave, which leads to greater contamination of the grains separated on the concave. To the contrary, the throughgoing openings which are too small lead for example to clogging of the throughgoing openings, and therefore of the concave, with greater grains. Thereby the danger of corn breakage increases, so that the not thrashed crop above the concave separating area is blocked by further subsequent crop and in addition reduces contacting by the threshing drum.

German patent document DE 3832996 discloses a device for adjusting the distance between two successive rods on a concave. The rods are components of the concave and determine the throughgoing size for the crop. By adjusting the distance between two successive rods, in the same concave, without reconstruction of the elements, each type of harvest can be sufficiently threshed and separated. This is achieved in that each second rod is supported turnably. Flap elements are stationarily mounted on the rotatable rods. By turning the rods, the flap elements are moved in the corresponding rotary direction and in the space located in front of the movable rods. The turning rod is moved by the movement to the non-turnable rod.

The disadvantage is here the position which the flap elements assume in the turned position. In the lowered condition the flap elements are arranged inclined under the throughgoing openings. In this way the passage of the crop is prevented. The threshing of the crop is limited, since the free space under the separating surface of the concave is partially filled by the flap elements, that finally limits the further feeding of the crop after the threshing. Since the crop can no longer pass without obstacle between the rods, this leads to clogging in connection with grain breakage.

SUMMARY OF THE INVENTION

Accordingly, it is an object of the present invention to provide a method of and a device for changing throughgoing openings in an agricultural harvester, in particular a combined harvester, which is convertable in a structurally simple and cost-favorable manner and allows a fine threshing of different crops without any negative effects.

In keeping with these objects and with others which will become apparent hereinafter, one feature of the present invention resides, briefly stated in a method for changing throughgoing openings in a separation area of a concave in an agricultural harvester in which the concave is composed of at least one frame, a plurality of beater strips and wires together forming the concave separating area, the method comprising the steps of arranging at least one adjusting device under the concave separating area; and adjusting a width of the throughgoing openings by the at least one adjusting device.

The other feature of the present invention resides, briefly stated, in a device for changing throughgoing openings in a separating area of a concave in an agricultural harvester in which the concave is composed of at least one frame, and a plurality of beater strips and wires which together form the concave separating area, the device comprising an adjusting device composed of a plurality of individual tines which are in operative connection with one another through at least one tine strip; a switching shaft; and at least one cam arranged on said switching shaft and controlling said tine strip.

Since the width of the throughgoing openings is changeable by at least one adjusting device arranged under the concave separating area, no change is needed for the available concave. In addition with the change of the width of the throughgoing opening it is guaranteed that a separation in an inlet region of the concave is avoided, so that under the action of the centrifugal force on the threshed grain, an increase of the concentration of grains in a threshing gap in the region of the concave can be performed, before a grain-chaff mixture is separated on the concave. This is especially advantageous in that the part of the separated non-grain component can be reduced, so that overloading phenomena at the following working elements, in particular in the cleaning device, can be avoided in a simple manner.

The adjusting device is arranged in the concave, and in accordance with the present invention is located under the concave separating area. Thereby the concave during harvesting can be fully loaded, without negatively influencing the crop harvesting by the adjusting device. An adjustment of individual rods or beater strips relative to one another is no longer necessary.

By guiding the adjusting device from above between the wires of the concave, the threshing and working region above or on the concave separating area remains not contacted.

The lateral and/or outward displacement of the adjustment device enhance the threshing of the crop. The adjusting device in its initial condition can be arranged so that the grains falling on it can be transported further without being limited by the adjusting device. A crop clogging is thereby excluded. In addition, the adjusting tines are introduced in the space between two neighboring beater strips, without a distance change between the beater strips or wires, that provides a significant technical simplification.

In view of the simple construction of the total adjusting mechanism, the adjusting tines can be lowered when not in use, without negatively influencing the further harvesting process, whereby the grains are directly threshed without negatively influencing their further transportation. Since the lowering is performed at a certain increased concentration of the crop on the concave separating area, correspondingly clean crop is separated, since the non-grain components are transported further before this.

The adjusting device is composed of a plurality of adjusting tines, which are in operative communication via at least one tine strip, and the tine strips are controlled via at least on cam arranged on a switching shaft. Therefore, the adjusting of the width of the throughgoing openings is controlled synchronously, and the adjustment of the width of the throughgoing openings is performed also synchronously and simultaneously. This guarantees a uniform threshing.

This synchronous adjustment can be expanded in a structurally simple manner to a plurality of tine strips connected in series. For this purpose all tine strips are controlled by a single switching shaft.

A particularly uniform threshing is provided when the adjusting tines of the adjusting device are arranged in lower condition on the vertical plane under the wires and/or beater strips. Due to this arrangement, the threshed grains pass without obstacle through the concave and so that the adjusting tines do not limit the required space.

The vertically adjustable arrangement of the adjusting device between the beater strips acts so that the adjusting tines can be also vertically adjustable in the vertical position between the wires of the concave. It is possible to position the adjusting tines deeper than the wires. Thereby during the threshing process first and mainly the beater strips and the wires are loaded, and after the adjusting tines. The load distribution serves for clearing the adjusting device and in particular the adjusting tines. On the other hand, the adjusting tines can be arranged also on one plane with the wires. Thereby a uniform separating area is provided.

In a structurally simple manner the distance of the adjusting devices relative to one another and/or the distance of the individual tines relative to one another can be equal or different. Thereby the size of the throughgoing openings can be additionally varied.

With the exchangeability of the total adjusting device is guaranteed that the exchange or the removal of the adjusting device can be performed also during the use in a simple manner. This in particular has the advantage that it is possible to react to changing harvesting conditions fast and without expensive conversion works.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a view showing a section along line IV—IV in FIG. 2 with a lowered adjusting device, in accordance with the present invention; and FIG. 5 is a section taken along line V—V of FIG. 2 corresponding to FIG. 4, however with a lifted vertically adjusted adjusting device, in accordance with the present invention.

DESCRIPTION OF THE PREFERRED EMBODIMENTS

Figure 1:
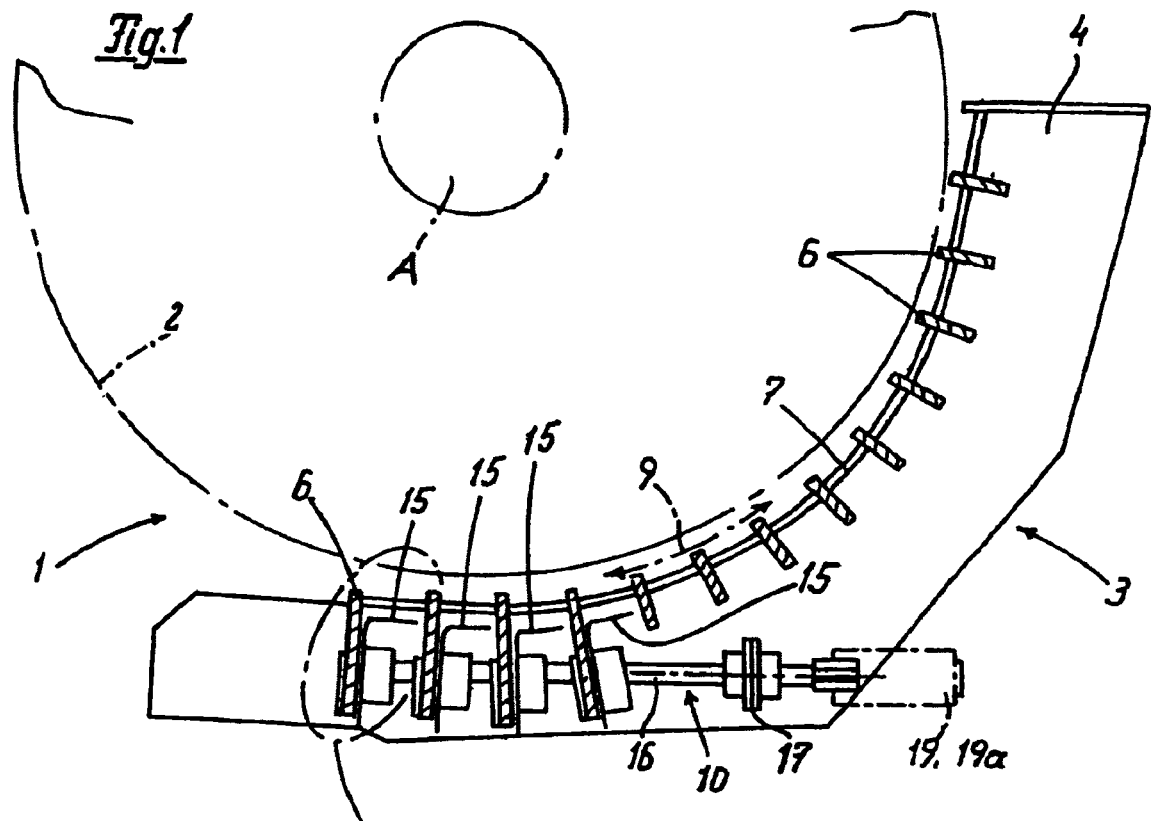
FIG. 1 is a view showing a section taken along the line I—I in FIG. 2 through a concave with a lowered adjusting device, in accordance with the present invention.

FIG. 1 is a view showing a threshing mechanism of a not shown combine harvester on a side view. The threshing mechanism includes a drivable threshing drum 2 and an associated concave 3. The concave 3 is composed of a frame 4 and a plurality of webs 5 and beater strips 6 stationarily integrated in it.

Figure 2:
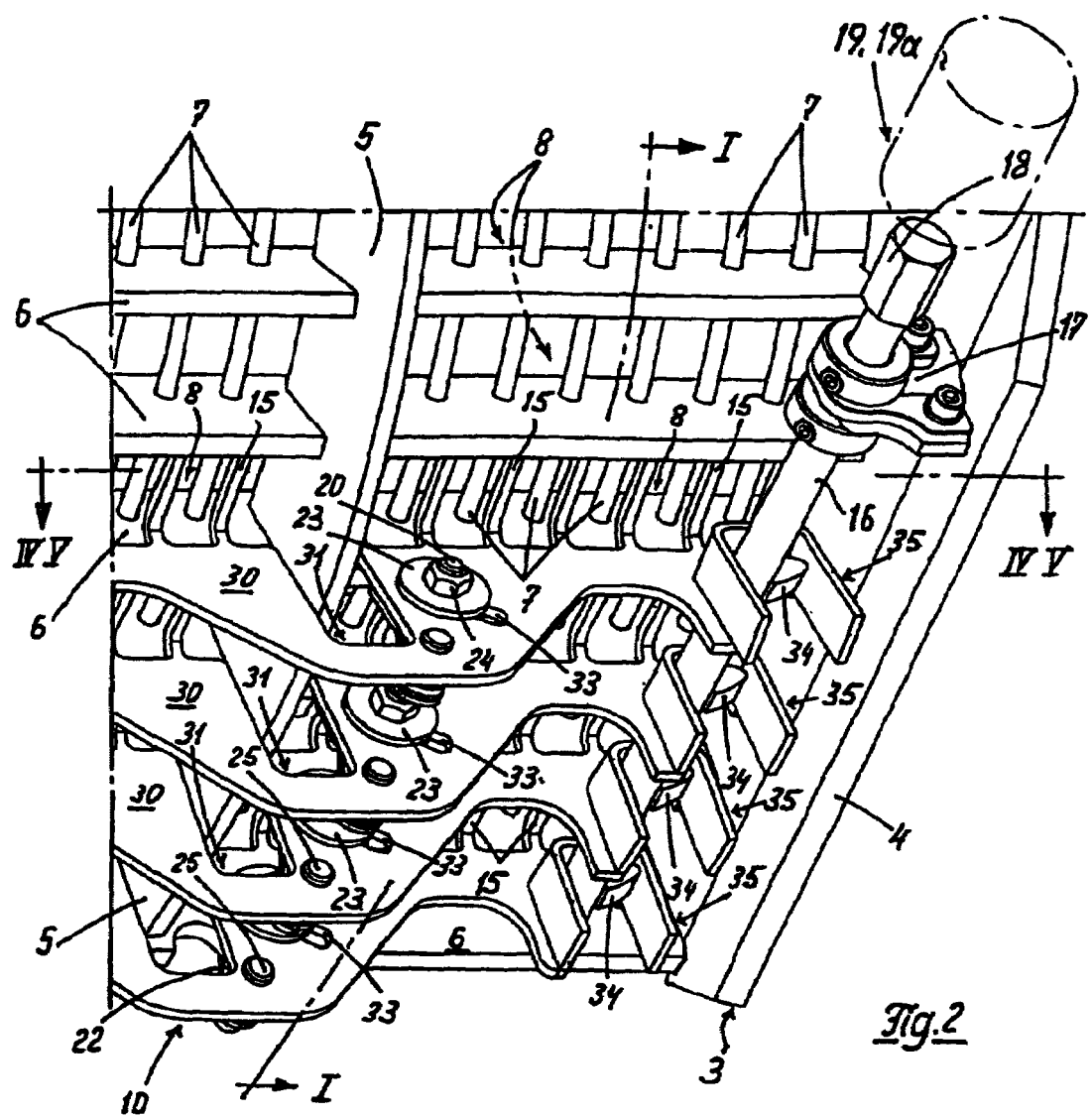
FIG. 2 is a perspective view of a concave portion with the adjusting device and a switching shaft, in accordance with the present invention.

FIG. 2 shows a perspective view of an adjusting device 10 under the concave 3. Several tine strips 30 are located one behind the other in a row. FIG. 2 shows that in a structurally simple manner any number of the tine strips 30 can be arranged under the concave 3. The adjusting device 10 can cover basically the whole region under the concave 3. For providing a synchronous control the tine strips 30 when needed, they are controlled simultaneously and synchronously by a single switching shaft 16. An adjustment is performed in accordance with the principle which is illustrated in FIGS. 4 and 5.

Wires 7 which are located parallel to one another extend through openings inside the beater strips 6. Individual throughgoing openings 8 of a concave separating area 9 are formed by the distances between the wires 7 and the beater strips 6 with respect to one another. The size of the throughgoing openings 8 determines the comminution degree of the product mat between the threshing drum and a concave. For different crop types, differently dimensioned throughgoing openings 8 are required, to guarantee an efficient threshing and separation of the grains.

The inventive adjusting device 10 is arranged under the concave separating area 9. The width of the throughgoing openings 8 is adjustable by the adjusting device 10. The adjusting device 10 is composed of a plurality of adjusting tines 15 which are arranged behind and near one another, separated by neighboring beater strips 6. They extend radially at an angle to the threshing drum rotary axis A shown in FIG. 1, in correspondence with the concave shape. The adjusting tines form a structural unit with a tine strip 30. The switching shaft 6 serves for adjusting the adjusting tines 15 or the tine strips 30 and is connected at an outer side through a console 17 stationarily with the frame 4. At the rear end of the switching shaft 16 it can be formed with a wrench width 18 for adjustment. Thereby the adjusting can be performed manually. In a further embodiment of the present invention, the adjustment can be performed by an electric motor 19 shown in a broken line in FIG. 1 or an adjusting lever 19a.

Figure 3:
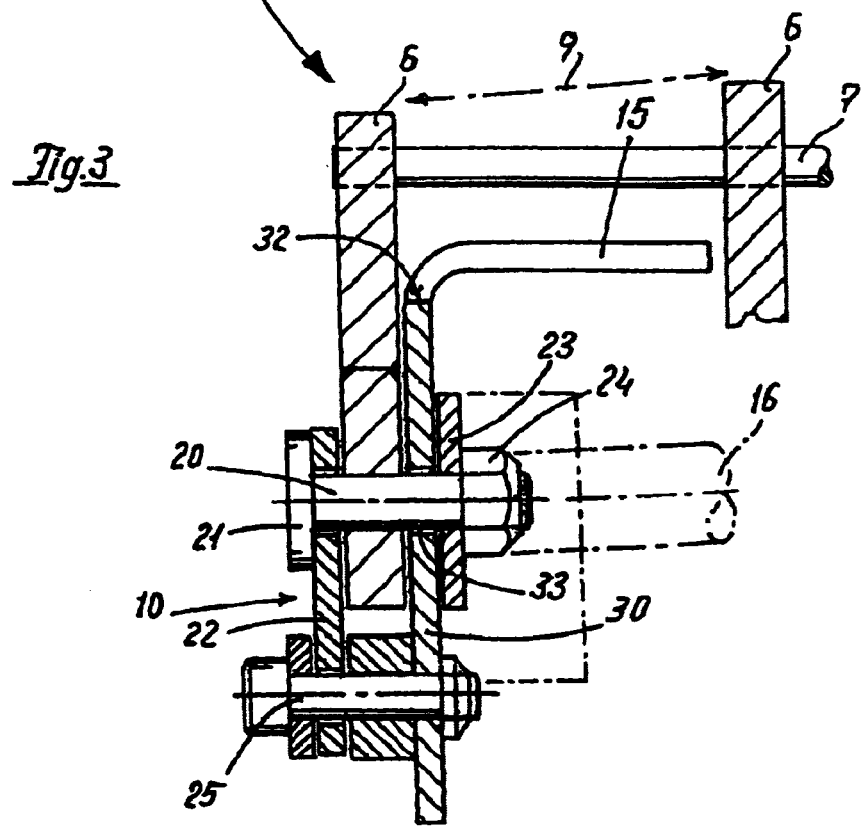
FIG. 3 is a view showing a section of a part of the concave taken along the cutting line in FIG. 4, in accordance with the present invention.

FIG. 3 shows a section of a detail of FIG. 1 identified with a dash-dot line. It illustrates the arrangement of the adjusting device 10 and the adjusting tines 15 relative to the beater strip 6 and the concave wires 7.

In the initial position or rest position, the adjusting tines 15 as shown in FIG. 1, are located under the wires 7 and in the same vertical plane. The tine strip 30 is movably connected by a pin 20 with a console 17 which is additionally welded on the beater strip 6. A rotatable control plate 22 is integrated between a screw head 21 and a console 17. The pin 20 which passes through the free end of the console 17 is associated with the adjusting device 10 which obtains a predetermined arrangement relative to the beater strip 6 by a cover disk 23 which is fixed with a nut 24. The control plate 22 is connected with a further pin 25. This connection corresponds to the previously described connection of the pin 20 and therefore is not explained in detail.

The nature of the cooperation of the arrangement of the pins 20, 25, the control plate 22, and the adjusting device 10 can be seen from FIGS. 4 and 5.

FIG. 4 shows the adjusting device 10 in a lowered condition. The adjusting tines 15 are located directly under the wires 7 of the concave 3. The tine strips 30 follow, as the beater strips 6, the geometry of the concave 3. In the region of the webs 5, the tine strips 30 are provided with recesses 31 that allow a lateral displacement of the tine strips 30 of the adjusting device 10. In the region between the adjusting tines 15, the tine strips 30 have depressions 32 that allow a movement of the adjusting tines 15 in the intermediate spaces between the wires 7, without limiting the adjustment ability of the tine strips 30 by the available wires 17 of the concave 3.

A console 17 is shown in dash-dot line behind the tine strip 30 in FIGS. 4 and 5. This console 17 is fixedly connected with the beater strip. The console 17 is in turn in operative connection with a control plate 22 arranged stationarily but rotatably on the tine strip 30. The control plate 22 is also shown in a dash-dot line and is connected in its end regions by the corresponding screw pins 20, 25 rotatably with the console 17 and the tine strip 30. During displacement of the adjusting device 10 along the tine strip 30, the pin 20 leads the tine strip 30 along an elongated hole 33 provided in the tine strip 30. Due the connection between the control plate 22, the tine strip 30 and the console 17, as well as the shape of the elongated hole 33, the adjusting tines 15 are turned to the corresponding position. The shape of the elongated hole 33 determines a curved path 36 (FIG. 4), over which the adjusting tines 15 move from their lowered position 37 to their raised position 38 for at least partially closing the throughgoing openings 8.

In the lowered position of the adjusting device 10, the adjusting tines 15 are arranged directly under the wires 7 of the concave 3. This position is adjusted by turning of the cam 34. The cam 34 moves inside a switching coulisse 35 and is located in a disengaged position 37 of the adjusting tine 15 flush at the right side of the switching coulisse 35. The switching coulisse 35 is preferably U-shaped. For performing the adjustment of the device 10, the cam 34 that is stationarily integrated on the switching shaft 16, can be controlled manually, mechanically or hydraulically and turned in an arrow directions 39.

The lowering of the adjusting device 10 is performed in accordance with the present invention when high quantity of grains are concentrated on the concave separating area 9. By the correspondingly performed lowering of the adjusting device 10 the collected grains with a small part of non-grain components move over the wires 7 into a not shown working unit, for example a cleaning device.

As can be seen from FIG. 5, the adjusting device 10 after complete adjustment of the cam 34 is located in a raised position, and the adjusting tines 15 are located in their set up position 38. The cam 34 abuts then flush at the left side of the switching coulisse 35. Thereby the tine strips 30 are displaced to the left by the length of the cam 34. For positioning of the adjusting tines 15 of the tine strips 30 accurately between the wires 7 of the concave 3, the tine strips 30 as described herein above, are connected with a console 17 which is arranged stationary on the beater strip 6.

By controlling the cam 34 the tine strip 30 is displaced inclinedly upwardly. This displacement is obtained by displacing the control plate 22 to the left by an identical amount as the tine strip 30. Thereby the pin 20 of the tine strip 30, which is in operative connection with the control plate 22 and the console 17, is guided along the elongated hole 33. In this manner the adjusting device 10 obtains the accurate adjustment.

The present invention, and in particular its method and a device for performing the method, are not limited only to the concave 3 of an agricultural harvester, but instead can be used in any working machine for obtaining the same effect.

It will be understood that each of the elements described above, or two or more together, may also find a useful application in other types of constructions differing from the types described above.

While the invention has been illustrated and described as embodied in method of and device for changing throughgoing openings in separation area of a concave of a harvester, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method for changing throughgoing openings in a separation area of a concave in an agricultural harvester in which the concave is composed of at least one frame, a plurality of beater strips and wires together forming the concave separating area, the method comprising the steps of arranging at least one adjusting device under the concave separating area; and adjusting a width of the throughgoing openings by the at least one adjusting device.

2. A method as defined in claim 1; and further comprising guiding the adjusting device from below between the wires of the concave.

3. A method as defined in claim 1; and further comprising guiding an adjusting device between the wires in a direction selected from the group consisting laterally, outwards and both.

4. A method as defined in claim 1; and further comprising bringing back the adjusting device to its initial position in a direction selected from the group consisting downwardly, laterally, and both.

* * * * *